INVENTOR.
WALTER BELL
BY
Friedman & Goodman
ATTORNEYS

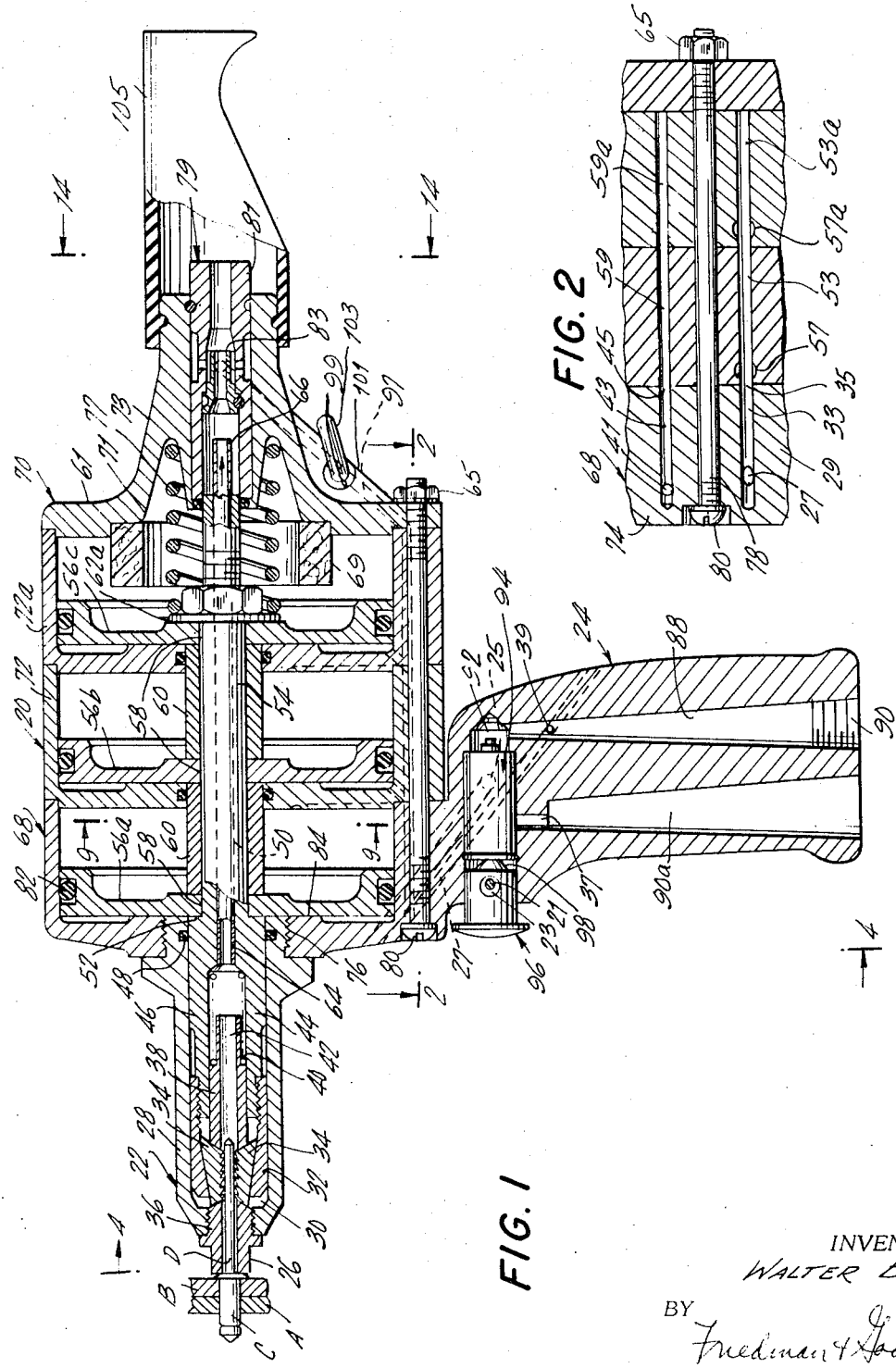

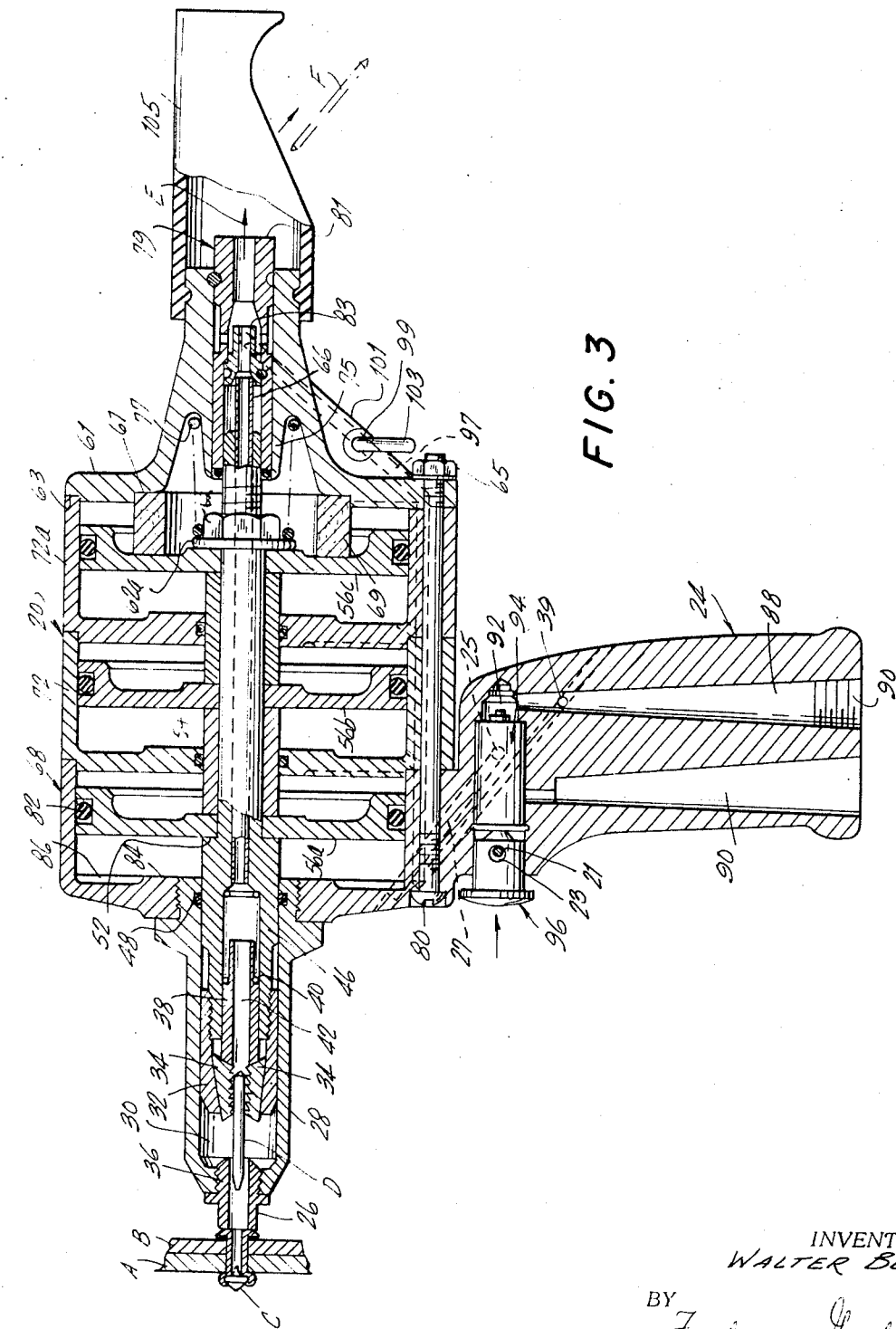

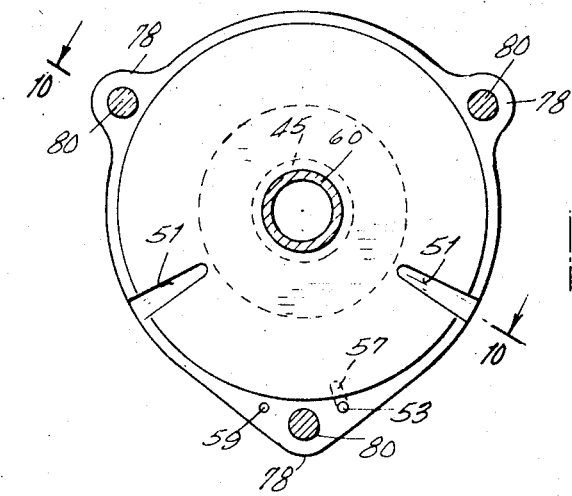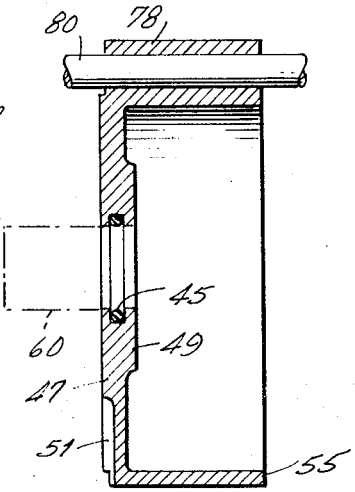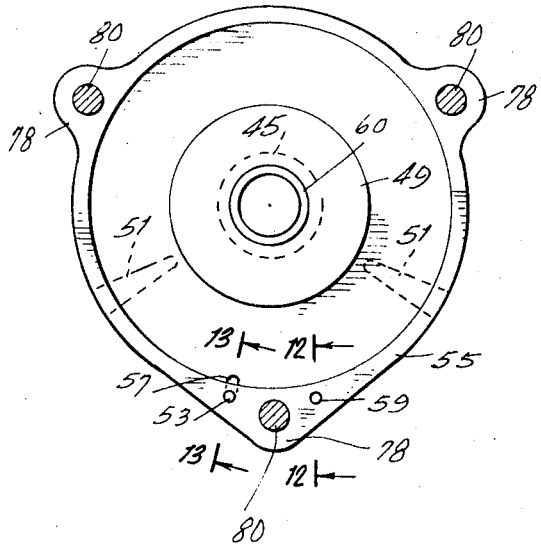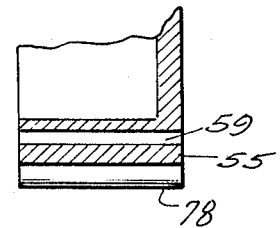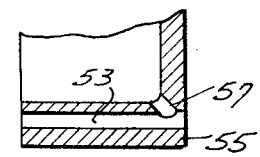

FIG. 14
FIG. 15
FIG. 16
FIG. 17
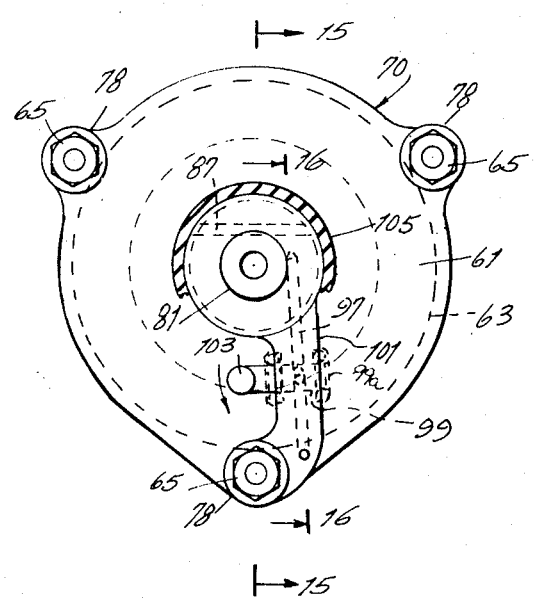
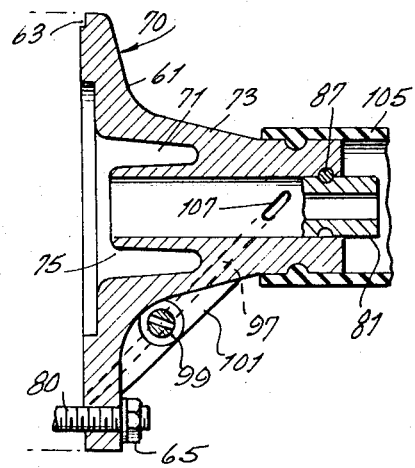
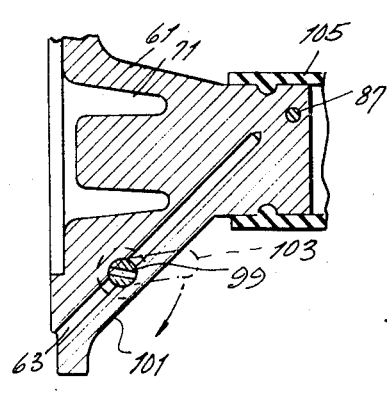
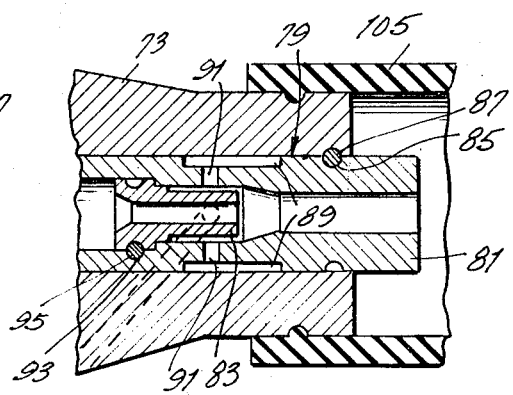
INVENTOR.
WALTER BELL
BY
ATTORNEYS

United States Patent Office 3,451,248
Patented June 24, 1969

3,451,248
RIVET SETTING TOOL
Walter Bell, Monroe, N.Y., assignor to Star Expansion Industries Corporation, Mountainville, N.Y., a corporation of Delaware
Filed Jan. 26, 1967, Ser. No. 611,956
Int. Cl. B21j *15/10*
U.S. Cl. 72—391           8 Claims

ABSTRACT OF THE DISCLOSURE

This disclosure is directed to a new and unique tool for upsetting blind rivets. More particularly, it is directed to a rivet setting tool which is pneumatically operated and relates to new and improved means for assembling tools of varying power capacity wherein the pneumatic means is also operable to retain the rivets in position and to eject the severed rivet mandrel stems therefrom automatically utlizing a common source of pneumatic power. The disclosure includes the provision of modular structure for the tool whereby its power capacity may be varied in direct proportion to the number of cylinder units employed and provision is made for an integrated vacuum arrangement whereby severed rivet stems are withdrawn and ejected from the tool by means utilizing the same power source as that used for operating the tool.

FIELD OF THE INVENTION

This invention resides in the field of pneumatic power operated rivet setting tools particularly adapted for the setting of blind rivet assemblies of the type wherein the rivet barrel is set in a work piece by the tensioning of a mandrel stem having an enlarged rivet setting head engageable with the blind end of the rivet barrel. Further, this tool can be effectively employed for the tensioning of a mandrel in a rivet assembly wherein upon completion of the rivet setting operation the mandrel stem is designed to sever or break as a result of the tensioning stress applied by the setting tool.

DISCUSSION OF THE PRIOR ART

Pneumatically operated power tools for upsetting power tools are generally and broadly known in the art. Such art does not, however, provide for the modular construction herein set forth wherein the power capacity of the tool may be readily adapted to differing power requirements and integrated vacuum producing means for producing a zone maintained below atmospheric pressure are provided for retaining the rivet and ejecting the severed mandrel stem.

OBJECTS OF THE INVENTION

The objects of the invention will be clear from the foregoing and from the more detailed drawings, specification and claims forming part hereof.

SUMMARY OF THE INVENTION

Broadly, this invention contemplates a blind rivet setting tool which is pneumatically operated. The tool is comprised of a front cylinder unit and an end plate assembly which may be used as a unit or between which one or more intermediate cylinder units may be interposed; intermediate cyilnder units being identical and providing for interconnecting air passages so that upon assembly of the units the tool is operable from a common air supply source. The power capacity of the tool is thus directly proportional to the number of cylinder units employed. Additional means are provided for drawing the severed mandrel stems through the tool by means of an integrated vacuum arrangement and expelling the stems from the tool. By decreasing the air pressure the tool may of course be utilized for setting the rivets without severing the stems.

BRIEF DESCRIPTION OF FIGURES

FIGURE 1 is a sectional view partly broken away showing the tool in the extended, normal, at rest position and a rivet disposed therein;

FIGURE 2 is a sectional view taken along line 2—2 of FIGURE 1;

FIGURE 3 is a sectional view similar to FIGURE 1 showing the tool in retracted position, the valve trigger having been released and the rivet mandrel stem having been severed; the figure also showing the manner in which a rivet stem is normally expelled from the tool;

FIGURE 9 is a front elevational view of an intermediate cylinder unit showing the clamping bolts in section;

FIGURE 10 is a sectional view taken along line 10—10 of FIGURE 9;

FIGURE 11 is a rear elevational view of the intermediate cylinder unit shown in FIGURE 9, as seen when looking into the interior of the cylinder;

FIGURE 12 is a sectional view taken along line 12—12 of FIGURE 11;

FIGURE 13 is a sectional view taken along line 13—13 of FIGURE 11;

FIGURE 14 is a rear elevational view taken along line 14—14 of FIG. 1 of the tool showing the deflecting boot in section;

FIGURE 15 is a sectional view taken along line 15—15 of FIGURE 14 showing the body of the end plate with associated parts removed;

FIGURE 16 is a sectional view taken along line 16—16 of FIGURE 14 showing the air passage therein but with associated parts removed; and FIGURE 17 is a sectional view on an enlarged scale showing the vacuum inducing arrangement disposed within the neck of the end plate.

Figure 4:
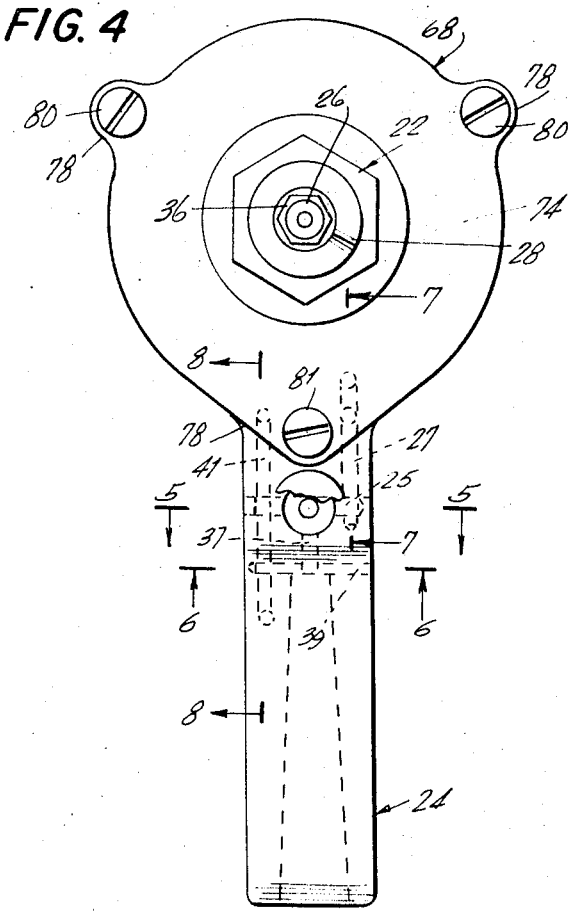
FIGURE 4 is a front elevational view taken along line 4—4 of FIG. 1 of the tool partly broken away.
Figure 5:
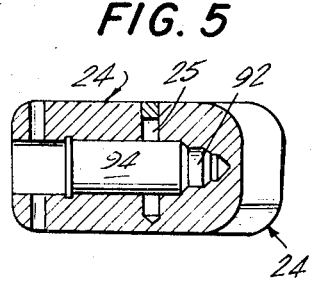
FIGURE 5 is a sectional view taken along line 5—5 of FIGURE 4, the valve trigger having been removed.

Referring to the drawings and in particular to FIGURES 1, 2 and 4, the rivet pulling tool therein illustrated is provided with a rivet engaging and pulling assembly, indicated in general by the numeral 22; a cylinder assembly, indicated in general by the arrow 20, within which is housed the pneumatic motor mechanism to provide the requisite reciprocative linear motion for the operation of the pulling assembly; and a handle portion 24 providing the requisite means for connecting the tool to a source of compressed air as well as constituting a support for trigger operated valve means for controlling the operation of the tool.

In FIGURES 1 and 2 there are shown a pair of workpieces A and B, such as metal plates each having a drilled opening into which a rivet body C to be set has been inserted. The mandrel portion D of the rivet assembly is then inserted into the nosepiece of the pulling head assembly until the anvil throat 26 of the nosepiece is in firm contact with the flanged portion of the rivet body. The pulling head assembly 22 is of well known type in its operation. The following brief description will suffice to explain the cooperative interrelation of the pulling head assembly with the rest of the tool.

PULLING HEAD ASSEMBLY

The pulling head assembly 22 is of a hollow tubular construction and includes a tubular housing 28 having a bore 30 within which a jaw case or retainer 32 is slidably mounted for axial reciprocation. Toothed jaw members 34 are cooperatively arranged in a circle within jaw retainer 32, so that forward pressure of the jaws against the inner end of the nosepiece 36 will force the jaws apart to receive or release the mandrel stem D. The separation of the jaws is additionally accomplished by the tubular jaw expander 38, the forward or proximal end of which is provided with beveled surfaces which are in camming engagement with the complementary surfaces of the rear end surfaces of the jaw members, thereby forcing the jaw members apart under the resilient action of the compression spring 40. It will be noted that the bore 42 forms a continuation of the mandrel receiving bore defined by the juxtaposed faces of the jaw members. Rearward retractive movement of the jaw retainer 32 causes the jaws to grip and to tension the mandrel stem D as the jaws are moved rearwardly toward the remote end of the tool.

In this connection it will be noted that the anvil throat end 26 of the nosepiece 36 forms an abutment means for the flanged end of the rivet body. It will be further noted that the jaw case or retainer 32 is provided with a bore having a tapered or frusto-conical forward portion. The jaw members 34 taper in a forward direction in a manner complementary to the frusto-conical surface defined by the bore of the jaw retainer 32. The retainer and jaws held thereby are power-operated rearwardly by means of draw barrel 44 which is in threaded engagement with the jaw retainer. The draw barrell 44 in turn forms part of a pneumatically operated piston assembly to be hereinafter described. It will be noted at this point that the forward or proximal end 46 of the draw barrel 44 is enlarged and is slidably journaled in housing 28 and bears against a sealing O-ring 48 which provides an air seal therefor during the reciprocation thereof. The bore 40 extending throughout the length of the draw barrel is coaxial with the bores defined by the jaws 34 and the tubular jaw expander 38 and forms a continuation thereof.

PISTON HEAD ASSEMBLY

The draw barrel 44 is provided with a shoulder 52 from which a reduced diameter piston rod portion 54 extends rearwardly and effectively supports a plurality of circular piston heads 56a, b and c. The piston heads 56a, b and c are provided with a central bore 58. The piston heads are similar in construction and are equidistantly spaced along said piston rod portion of the draw barrel 54 by means of intermediate spacer bushings 60.

The remote or rear end of the piston rod portion 54 of the draw barrel is threaded and mounts a clamping nut 62. A washer 62a is interposed between the nut 62 and the raised boss formed on the rear face of the piston head 56c surrounding the bore 58. As a consequence of this arrangement the tightening of the nut 62 effectively clamps the piston heads 56a, b and c in position and thus forms a unitary piston assembly comprised of the draw barrel and the piston heads mounted thereon. It will be noted that the draw barrel is provided with a liner 64 which includes a funnel shaped forward portion at its forward end and a tail portion 66 which extends beyond the draw barrel 44.

CYLINDER ASSEMBLY

The piston assembly is disposed within the cylinder assembly 20 of the tool for reciprocative movement therein. The cylinder assembly is comprised of a front cylinder unit designated generally by the numeral 68, a rear end plate designated generally by the numeral 70, and intermediate cylinder units designated generally by the numerals 72 and 72a. It will be understood, as will more clearly appear hereafter, that the end plate 70 may be mounted directly upon the front cylinder unit 68 or one or more intermediate cylinders may be interposed therebetween in accordance with the power requirements of the particular application. The front cylinder unit 68 is illustrated in FIGURES 1, 3 and 4. As will be seen from said figures said front cylinder unit 68 is comprised of a cylinder shell portion having an integrally formed handle portion 24 depending therefrom. The cylinder head 74 of front cylinder unit is provided with a threaded central bore 76 within which the tubular housing 28 of the rivet engaging and pulling assembly 22 is received so as to threadably mount the same. A plurality of circumferentially spaced apertured ears 78 are provided on the external surface of the unit for receiving the clamping bolts 80. The cylinder shell of the front cylinder unit has disposed therein piston head 56a of the piston assembly for reciprocation therein under pneumatic pressure. In order to provide for an air seal an O-ring 82 is disposed within a circumferential groove found in each of the piston heads 56a, b and c and comprises a piston ring therefor.

It will be noted that in the at rest or normal position of the tool the front face of the piston head abuts the raised boss 84 formed on the interior face of the front cylinder head 74 and that a circular depressed area surrounds said boss. There is thus formed a pocket 86 into which compressed air may be introduced to initiate the power stroke of the tool as will more particularly appear hereinafter.

The front cylinder unit 68 is also provided with conduit means for connection to a source of compressed air supply and for introducing the same at the desired locations in the tool. Thus the handle portion 24 has formed therein an air inlet conduit 88 which is provided with a threaded mouth 90 suitable for connection to the coupling element of an air supply hose and an exhaust conduit 90, 90a through which the spent compressed air from the cylinders may be exhausted.

As may be seen from FIGURES 1 and 3 and more particularly from FIGURES 4–8, the handle also has formed therein as by means of suitably drilling the same through the body of the unit and plugging the undesired openings, a plurality of air passages. Since, after the initial introduction of air into the front cylinder unit the flow is utilized for two independent purposes, namely, for providing air power to the cylinders on the one hand, and for producing a vacuum by means of a Venturi arrangement, the air or passages for the former will be designated as power air and passages, while the air or passages for the latter will be designated as Venturi air or passages.

Thus air introduced into the air inlet conduit passes into the rear portion of a valve chamber as indicated 92 and thence into the body of a cartridge valve 94 disposed within a portion of said chamber. Cartridge valve 94 controls the flow of power air and is of conventional design and will not be described in detail. The valve 94 is operated by means of a reciprocable trigger or plunger 96 which is provided with a hemispherical end 98 which bears against the valve end. The movement of the trigger is limited by means of a cross-pin 21 which is disposed within a larger diameter transverse bore 23 formed in the body of the trigger. When the trigger is depressed, power air from chamber 92 is permitted to pass through the valve into the opening 25 of power passage 27. Power passage 27 is diagonally disposed within the handle body and extends into the cylinder portion of the front cylinder unit. As may be more clearly seen from FIGURE 7, power passage 27 traverses the juncture of the front cylinder head 74 with the cylinder wall 29 to thus form a power air port 31 into the interior of the front cylinder. It will be noted that the port 31 opens into the depressed area of the interior of the cylinder head.

It will also be noted that power passage 27 also intersects an axially extending power passage 33 which passage is open at the rear face of the cylinder wall 37 as indicated at 35. It will thus be apparent that compressed air introduced through conduit 88 is passed into the front cylinder under the control of a manually operable valve and is then conducted into the cylinder proper and that a further power air passage is provided in the cylinder wall for feeding power air into the next adjacent cylinder as will hereinafter more clearly appear. The power passages are also utilized for exhausting spent air from the cylinders on the return stroke of the pistons. The return stroke of the pistons is initiated by the release of finger presure upon trigger 96 which permits the cartridge valve to return to its normal position shutting off communication between the opening 25 of passage 27 and the rear portion of valve chamber 92. The valve simultaneously opens communication between the opening 25 of passage 27 and the reduced portion 37 of exhaust conduit 90 the bottom of which is open to the atmosphere. The spent power air may thus pass through port 31 and opening 35 into power passage 27 and thence passes into the valve through opening 27 to be exhausted to the atmosphere through exhaust conduit 90.

Figure 6:
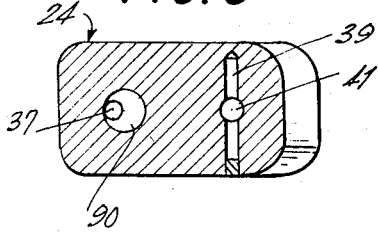
FIGURE 6 is a sectional view taken along line 6—6 of FIGURE 4.
Figure 7:
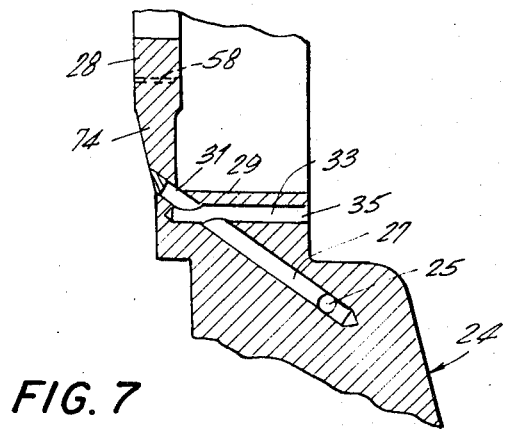
FIGURE 7 is a sectional view taken along line 7—7 of FIGURE 4.
Figure 8:
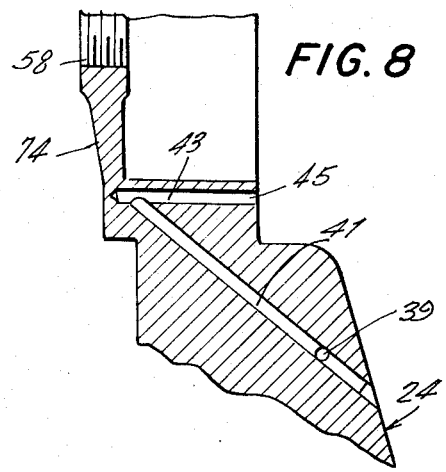
FIGURE 8 is a sectional view taken along line 8—8 of FIGURE 4.

The vacuum forming Venturi arrangement requires a source of compressed air which is introduced through opening 39 as may be seen in FIGURES 1 and 3 and more particularly in FIGURES 4, 6 and 8. Opening 39 communicates with diagonally extending Venturi air passage 41 which in turn intersects and therefore communicates with axially extending Venturi air passage 43 disposed in the front cylinder wall and is open at the rear face of cylinder wall 37 as indicated at 45, so that it will provide for a flow of Venturi air to the next adjacent cylinder. It will be noted that axially extending passages 33 and 43 are disposed in parallel relation along opposing sides of the bore within which a clamping bolt 80 is disposed.

INTERMEDIATE CYLINDER UNITS

The intermediate cylinder units are more particularly illustrated in FIGURES 1, 3 and 9–12. Since these units 72 and 72a are of identical construction more particular reference will be made to intermediate cylinder unit 72 it being understood that the same description applies to unit 72a. As may be seen from said figures intermediate cylinder unit 72 is composed of a cylinder shell which is similar in general conformation to the shell or cylinder portion of the front cylinder unit. It is formed with appertured ears 78 which register with similar ears on the front cylinder unit so as to enable the units to be clamped together by means of the axially extending bolts 80. An O-ring 45 is disposed in circumferential groove formed in the wall of the central bore of the cylinder head portion 47 of the intermediate cylinder unit. The O-ring 45 bears against the peripheral surface of the spacer bushing 60 carried by the piston rod and forms an effective seal during the reciprocative movement thereof. The central bore is surrounded by a raised boss and thereby defines a recessed circular area about said boss on the interior surface of said cylinder head 47. It will be noted that the external or forward face of the cylinder head is provided with a circumferential step or recess which serves to locate the cylinder units in concentric relation and permits the units to be maintained in alignment in clamped condition. As may be seen from FIGURES 9, 10 and 11, the forward or external head of the intermediate cylinder unit is provided with a pair radially disposed groover or gores 51 which extend to the marginal edge of the cylinder head. These gores 51 are open to the atmosphere when the tool is assembled and provide a venting means for the air behind the piston heads, permitting the escape of air to the atmosphere from behind the piston head during the power stroke of the tool and preventing the formation of a vacuum in that space as the piston is returned to its at rest or normal position.

The intermediate cylinder unit is also provided with air passage means whereby it is connected to the source of air power for actuating the piston disposed therein. Thus an axially disposed power air passage 53 extends from face to face of the cylinder wall in registry power air passage 33 of the front cylinder unit. A short diagonal bore 57, 57a at the convergence of the interior of the cylinder head with the side wall provides communication with the interior of the cylinder in the recessed area of the cylinder head without interfering with the continuity of the power air passage 53 so that the next adjacent unit may be supplied therethrough. It will be apparent that when the intermediate cylinder unit is brought into clamping engagement with the cylinder head a power air supply passage therefor is automatically established as well as with a next succeeding unit, if needed. The power air passage 53 will also function as an exhaust passage for the spent air upon the return stroke of the piston. In like manner, the intermediate cylinder unit when clamped in position automatically forms part of a continuous passage for the supply of air to the Venturi or vacuum arrangement. Thus there is provided a through passage 59 which registers with the opening 45 of Venturi air passage 43 of the front cylinder head unit thus forming a continuity thereof for supplying the desired air to the ultimate point of application.

As heretofore stated intermediate cylinder unit 72a is in all respects similar in construction to unit 72 and serves to illustrate the modular character of the instant invention. Any desired number of intermediate cylinder units may be assembled and interposed between the front cylinder unit and the end plate assembly depending upon the power requirements of the particular application. With the addition of intermediate power units an increase in effective power of the tool is readily accomplished. It will of course be understood that a change in the number of intermediate cylinder units also involves a change in the piston assembly to accommodate the same.

END PLATE ASSEMBLY

The tool is enclosed by means of an end plate assembly designated generally by the numeral 70. The said end plate assembly may be more particularly seen from FIGURES 1, 3 and 14–17. It comprises an end wall 61 which is of the same general conformation as the cylindrical shell portions of the front and intermediate cylinder units. It is similarly provided with a circumferential recess 63 which receives the end of the preceding cylinder wall. Registering, circumferentially spaced appertured ears 78 are adapted to receive the ends of the clamping bolts 80 so that it may be assembled therewith and clamped thereto to form a unitary structure. The clamping action is accomplished by means of the nuts 65 in engagement with the threaded ends of the clamping bolts 80. The end wall portion 61 of the end plate 70 is provided with a circular recess 67 within which a ring 69, formed of rubber or the like, is disposed. The ring 69 forms a bumper or shock absorbing pad for the piston head 56c as it abuts against the same upon reaching the limit of its rearward movement during the power stroke of the tool. A considerably deeper circular recess or groove 71 is formed in the neck portion 73 of the end plate and defines a sleeve 75 about which the return spring 77 is disposed. Said return spring 77 is of the compression type, one end of said spring abutting washer 62a and being disposed about nut 62 which thus prevents it from being dislocated, while the other end of said spring is seated at the bottom of groove 71 and is retained against dislocation by means of sleeve 75. As will be seen from FIGURE 3, spring 77 is compressed during the retractive or power stroke of the tool and serves to return the piston assembly to its extended, normal or at rest position by reason of the resilient action thereof.

The neck portion 73 of the back plate 70 houses a Venturi type vacuum device which serves to retain a rivet disposed within the pulling head of the tool as it is manipulated into position with respect to a workpiece, and also serves to withdraw and eject the severed portion of the rivet mandrel from the tool proper. It is a significant feature of this invention that the vacuum forming means is integrated with the tool and is rendered operative by the same supply source of compressed air as is used to actuate the tool.

The Venturi type vacuum forming arrangement is more particularly illustrated in FIGURES 1, 3 and 17. As will be seen from said figures said arrangement designated generally by the numeral 79 is comprised of an outer tube 81 and an inner tube 83 disposed therein. Outer tube 81 is provided with a peripheral groove 85 into which a portion of a transverse locking pin 87 extends to lock the same in position with respect to the neck portion of the back plate as seen in FIGURES 14 and 15. Said outer tube wall is also provided with a circumferential recessed portion 89. The tube wall defined by said circumferential recess is provided with a plurality of circumferentially spaced apertures 91 which provide air passages from the space defined by the recessed portion into the interior of the outer tube.

The inner tube 83 is disposed within the outer tube and is similarly provided with a peripheral groove 93 into which a portion of a transverse locking pin 95 extends thereby locating and locking the same in position with respect to the outer tube. The portion of the inner tube juxtaposed to said apertures 91 is of reduced diameter and provides a constricted circular orifice in conjunction with the interior wall of the outer tube thereby creating a Venturi effect in a well known manner. When a flow of air is introduced into the interior of the Venturi arrangement in the manner indicated, the air is moved in the direction of the arrow E thereby inducing a pressure drop downstream of the air flow and tending to evacuate the interior of the draw barrel liner and the bore defined within the pulling head assembly. In order to induce the vacuum downstream of the Venturi arrangement, means are provided for conducting a flow of air thereto. To this end the back plate is provided with a diagonal Venturi air passage 97 through web 101 the lower end of which is open at the front face of the end wall portion 61 of the end plate 70 and registers with the Venturi air passage 59a of intermediate cylinder 72a. The upper end of Venturi air passage 97 tangentially opens into the bore of the end plate neck 73 into the space defined by the circumferential recessed portion 91 in the peripheral surface of the outer tube 81, from whence it may enter the interior of the Venturi tube arrangement through apertures 91 causing a vacuum to be created throughout the length of the axial bore defined throughout the length of the tool. The flow of air supplied to the Venturi may be regulated by means of a rotatable metering valve 99 interposed in passage 97. Rotation of the valve element causes the cross bore in the valve to register in varying degree with the passage and may thus be used to regulate the air flow or to shut it off completely. FIGURES 15 and 16 showing the valve in closed position, when rotated in the direction indicated by the arrow in FIGURE 16, alignment of the cross bore with the axis of the passage will open the same. A sealing arrangement is provided comprised of a pair of O-rings 99a which are held in position on each side of web 101 by means of push nuts so that the valve arm 103 may be rotated without leakage of air.

A deflecting boot 105 preferably formed of a hard rubber or the like is mounted on the neck of the end plate as by means of a rib and groove arrangement. The deflecting boot directs the severed mandrel stem away from the operator as indicated at F in FIGURE 3.

It will be seen from the foregoing that a tool is provided which may utilize one or more cylinders for the pneumatic operation. The power applied to the mandrel stem will be in direct proportion to the number of cylinders utilized. By the use of the particular form of intermediate cylinder herein described this expansion of the tool capacity may be achieved with considerable advantage. In addition, integrated vacuum inducing means are provided for retaining the rivet in position during the operation and for expelling the severed mandrel stem.

While certain preferred and desirable embodiments have been shown and described above, these have been shown and described merely for purposes of illustration and not for purposes of limitation, as there is no intention in the use of the terms and expressions employed herein of excluding any equivalents thereof, or portions thereof, within the spirit and scope of the invention.

I claim:

1. A blind rivet setting tool for gripping and tensioning the mandrel stem portion of a rivet to set the rivet and sever the mandrel stem, comprising a pulling head assembly provided with retractable rivet engaging and gripping means, a cylinder assembly for mounting said rivet pulling assembly, and a piston assembly comprised of a draw barrel and a pistol mounted thereon disposed within said cylinder assembly for reciprocative movement, said draw barrel being operatively connected to said pulling head assembly, resilient means disposed within said cylinder assembly, yieldably urging said piston and pulling head assemblies forwardly into extended mandrel stem receiving position, pneumatic means interconnected with said cylinder and piston assemblies for retracting the piston assembly and the pulling assembly connected thereto beyond the position at which the mandrel stem becomes severed, said cylinder assembly being comprised of a front cylinder unit and an end plate enclosing said front cylinder unit, said front cylinder unit being provided with an air passage for connection to a source of compressed air for operating said piston assembly, and wherein a vacuum inducing arrangement is mounted by said end plate.

2. The tool according to claim 1, wherein said vacuum arrangement is of the pneumatically operated Venturi type.

3. The tool according to claim 2, wherein said vacuum device is operatively connected to the same source of air supply as is used for operating the piston head assembly.

4. A blind rivet setting tool for gripping and tensioning the mandrel stem portion of a rivet to set the rivet and sever the mandrel stem, comprising a pulling head assembly provided with retractable rivet engaging and gripping means, a cylinder assembly for mounting said rivet pulling assembly, and a piston assembly comprised of a draw barrel and a piston mounted thereon disposed within said cylinder for reciprocative movement, said draw barrel being operatively connected to said pulling head assembly, resilient means disposed within said cylinder assembly, yieldably urging said piston and pulling head assemblies forwardly into extended mandrel stem receiving position, pneumatic means interconnected with said cylinder and piston assemblies for retracting the piston assembly and the pulling assembly connected thereto beyond the position at which the mandrel stem becomes severed, said cylinder assembly being comprised of a front cylinder unit and an end plate enclosing said front cylinder unit, said front cylinder unit being provided with an air passage for connection to a source of compressed air for operating said piston assembly, a vacuum inducing arrangement being mounted by said end plate, said tool having an axial bore defined throughout its length to permit the passage of a severed mandrel stem from the pulling head assembly, through the tool and the expulsion through the end plate thereof, and wherein said pneumatic vacuum inducing arrangement mounted in said end plate is provided with an axial opening forming a portion of said axial bore for inducing a vacuum within said axial bore whereby a rivet disposed within said pulling head assembly is retained in position and upon the severence thereof is drawn through said axial bore and expelled through the bore of said end plate.

5. The tool accoding to claim 4, wherein axially disposed aligned interconnected air passages are provided in said front cylinder unit and said back plate for feeding compressed air to said vacuum inducing arrangement.

6. The device according to claim 4, wherein one or more intermediate cylinder units are interposed between said front cylinder unit and said end plate, said front cylinder unit and each of said intermediate cylinder units having axially disposed aligned air passages defined therein for feeding compressed air to the vacuum inducing arrangement disposed within said end plate.

7. The device according to claim 4, wherein said end plate is provided with an air passage for feeding compressed air to said vacuum inducing arrangement.

8. The device according to claim 7, including valve means interposed in the air passage defined in said end plate for regulating the flow of compressed air into said vacuum inducing arrangement.

References Cited

UNITED STATES PATENTS

| | | | |
|---|---|---|---|
| 2,088,859 | 8/1937 | Huck | 72—391 |
| 2,525,626 | 10/1950 | Stouffer | 92—151 |
| 3,082,898 | 3/1963 | Bosch | 72—391 |
| 3,196,662 | 7/1965 | Simmons | 72—391 |
| 3,255,675 | 6/1966 | Reeve | 92—151 |

CHARLES W. LANHAM, *Primary Examiner.*

G. P. CROSBY, *Assistant Examiner.*

U.S. Cl. X.R.

72—453